United States Patent
Coleman et al.

(10) Patent No.: US 6,217,066 B1
(45) Date of Patent: Apr. 17, 2001

(54) MULTIPLE INFLATOR SAFETY CUSHION

(75) Inventors: Daniel E. Coleman, deceased, late of Mesa, by Pamela A. Coleman, legal representative; Rick A. Adkisson; Michael C. Riley, both of Gilbert, all of AZ (US)

(73) Assignee: Am-Safe, Incorporated, Phoenix, AZ (US)

( * ) Notice: Subject to any disclaimer, the term of this patent is extended or adjusted under 35 U.S.C. 154(b) by 0 days.

(21) Appl. No.: 09/524,370

(22) Filed: Mar. 14, 2000

(51) Int. Cl.[7] .................................................. B60R 21/26
(52) U.S. Cl. ........................ 280/737; 280/742; 137/68.23
(58) Field of Search .................................... 280/736, 737, 280/741, 742; 137/68.19, 68.23

(56) References Cited

U.S. PATENT DOCUMENTS

| | | | |
|---|---|---|---|
| 3,972,545 | 8/1976 | Kirchoff et al. ........................ 102/40 |
| 5,348,344 | * 9/1994 | Blumenthal et al. ................. 280/737 |
| 5,460,405 | 10/1995 | Faigle et al. .......................... 280/735 |
| 5,863,066 | * 1/1999 | Blumenthal .......................... 280/737 |
| 6,095,561 | * 8/2000 | Siddiqui et al. ...................... 280/742 |
| 6,142,519 | * 11/2000 | Smith .................................... 280/741 |
| 6,149,193 | * 11/2000 | Canterberry et al. ................ 280/741 |

* cited by examiner

Primary Examiner—Paul N. Dickson
(74) Attorney, Agent, or Firm—Richard A. Speer; Mayor Brown & Platt

(57) ABSTRACT

Apparatus for use in passenger inflatable air-bag safety systems for preventing activation of an activator inflator from causing premature activation of any inflator not yet activated by system programming. The apparatus includes structure for isolating the pressure releasing construction from shock waves created when an inflator is activated and takes the form of mechanical barriers that isolate each inflator release structure from exposure to shock waves.

20 Claims, 2 Drawing Sheets

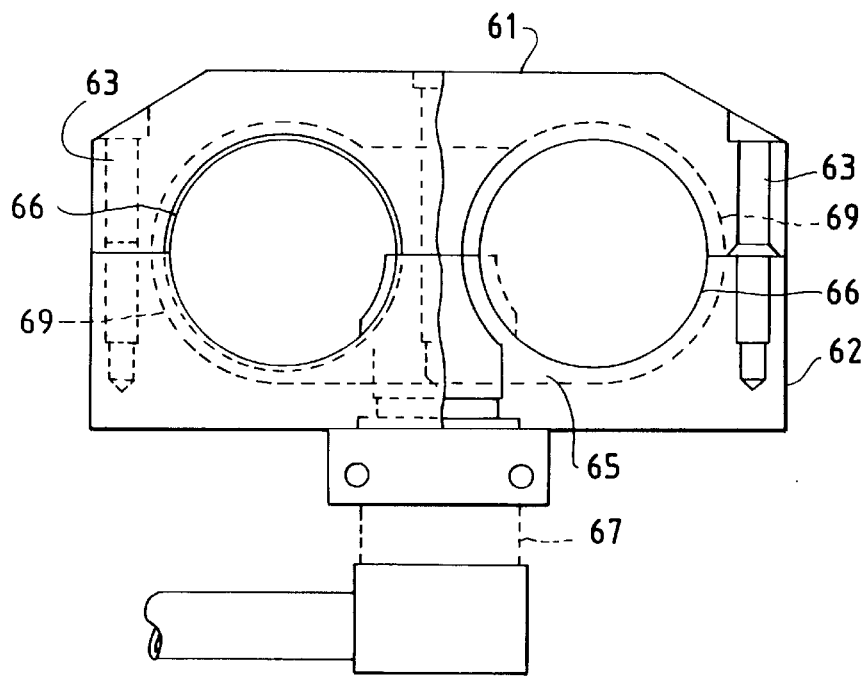
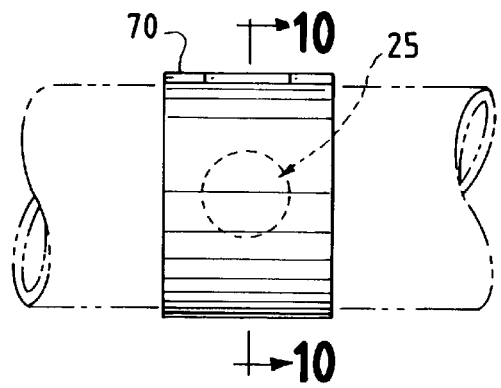
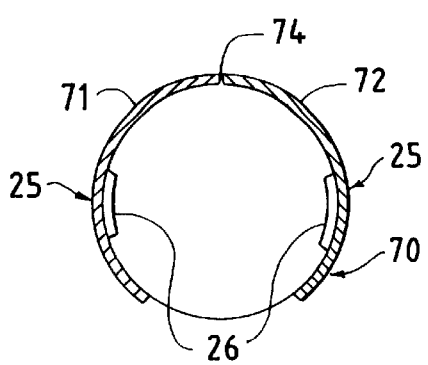
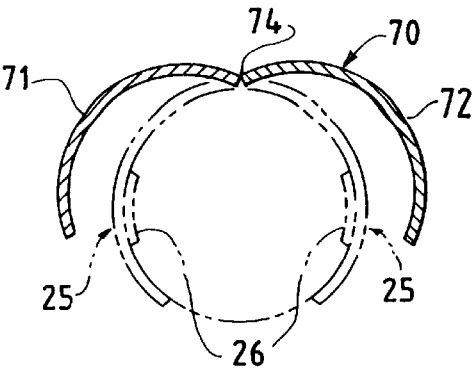

MULTIPLE INFLATOR SAFETY CUSHION

BACKGROUND OF THE INVENTION

This invention relates to safety systems for protecting vehicular passengers, such as those traveling in automobiles and aircraft, and more particularly to those safety systems which utilize passive restraints, such as air bags and similar inflatable restraints which require almost instantaneous inflation from gas sources, such as compressed air or the reaction products of pyrotechnic inflator cartridges.

Inflatable gas cushions (air bags) are widely used in certain types of passenger carrying vehicles, most prevalently in land based automotive equipment. Generally, passive passenger restraints, such as inflatable gas bags are filled by compressed air or other gases and are located in the automobile steering column and in other fixed locations within the automobile, such as the dashboard and side panels. In the event of sudden deceleration of the vehicle, as in a crash, sensors identify the event and the compressed air or other gas is released to expand the bags at high speed directly towards the passenger. Air bags have generally proven to be effective in alleviating to some extent injuries which might otherwise be occasioned by virtue of a passenger striking a rigid surface within the vehicle. On the other hand it has now become apparent through experience that in some instances occupants require protection from the rapid inflation of the aribag system itself.

It has in the past been proposed, for various reasons, to inflate the protective air or gas filled cushion gradually, usually by sequentially releasing inflating gas, so that the full force of deployment of the bag was extended over a longer period of time. Control of the rate of bag inflation might be desired for example, in response to the position of the vehicle occupant to be restrained, or as a function of the ambient temperature or even as a function of the severity of the impending crash event.

U.S. Pat. No. 5,460,405 which was issued Oct. 24, 1995 discloses a passenger protective inflating system in which an inflator assembly 20 is provided which contains a plurality of inflating gas sources 22, 24, 26 and 28 that are capable of supplying different volumes of gas, depending upon the instructions issued by controller 50. These four sources of inflating gas may be activated either simultaneously or in sequence depending upon the values received by controller 50 from sensors 52, 72 and 70.

A different type of multi-stage gas inflating apparatus is the subject of U.S. Pat. No. 3,972,545 which, in this case, discloses the use of separate quantities of ignitable materials contained within chambers 16 and 17 that are separated by a consumable partition 15. The reaction of combustible materials within chambers 16 and 17 are initiated by means of squibs 19 and 20 which can be fired either separately or simultaneously, depending upon the severity of the emergency situation that has been sensed.

When utilizing multiple sources of inflating gas, for example separate containers of compressed air, in which the gases are expanded and released suddenly in pulsed sequence into a common duct which flows the gas toward the cushion, a reverse pressure shockwave often results from the activation or firing of the first container of gas; this shockwave is then responsible for the premature activation or firing of the second or subsequent additional containers. Since sequential activation is undertaken to alleviate the severity of cushion expansion, the essentially simultaneous activation of all gas sources by the shock wave vitiates the original reason for sequential gas release.

OBJECTS OF THE INVENTION

It is a principal object of this invention to provide a passenger restraint system in which multiple inflator cartridges are provided and in which means is included to ensure that operation of one inflator cartridge is not responsible for premature activation of cartridges to be fired later.

It is an additional object of this invention to provide a multiple source inflator system in which transmission of a pressure wave between the first activated of a plurality of pressurized gas containers cannot effect premature activation and release of gas from containers programmed to be later released.

An additional object of this invention is to provide an inflation system utilizing multiple gas inflator sources in which sources can be sequentially fired and in which the shockwave generated by the first operated inflator container is shielded from additional inflator by means of suitable pressure isolating apparatus.

A further object of this invention is to provide a multiple source inflator system in which at least some of the inflator cartridges are provided with shielding apparatus that prevent activation of the cartridges by reason of shock waves occurring from earlier activation of other cartridges.

Additional object and advantages of this invention will be in part obvious and in part explained by reference to the accompanying specification and drawings, in which:

FIG. 8 is a sectional view of an isolator apparatus in which more than one inflator cartridge is disposed within a common volume;

FIG. 9 is a side view of a pressure isolating membrane, as mounted on an inflator cartridge;

FIG. 10 is a sectional view taken along this line 10—10 of FIG. 9; and FIG. 11 is a schematic illustrating the manner in which the pressure isolating membrane of FIGS. 9 and 10 expands to permit gas to be vented from the inflator cartridge.

SUMMARY OF THE INVENTION

The apparatus of this invention involves a system in which a multiplicity of sources of high pressure gas are sequentially activated to deploy an inflatable air cushion in a vehicle system. In the specific systems illustrated, there are two sources of inflating gas, although it should be recognized that more than two gas sources can be used if desired. As illustrated, the source of inflating gas comprise two inflator cartridges that are in the form of elongated tubular"

containers having initially sealed pressure outlet passages located in the wall of the cartridge. In the usual construction the outlets are sealed by frangible membranes that rupture when a cartridge is activated; but other sealing and releasing construction can as well be used. Activating or firing squibs are used to ignite combustible materials contained within the containers and appropriate sensing and firing circuitry are connected to the sources of inflating gas so that they are released at desired, preselected time intervals.

The invention includes providing apparatus which surrounds a portion of the outer cylindrical surface of the gas cartridges to define a volume so that gas escaping through the initially sealed outlet passages of the cartridges will be confined and directed toward an outlet port. When each cartridge has its own individual gas receiving chamber, the outlet port from each chamber is sealed by means for releasing pressure from a first and each remaining cartridge. The means takes the form of a one way valving mechanism which, when opened, permits the passage of gas into means defining a gas receiving volume such as a plenum that in turn collects the gas and directs it to tubing for transport to the inflatable member. Although a variety of one way valves could be used to insure that there can be no transmission of a pressure wave from one inflator to the other the present invention utilizes a unique flapper type valve that is simple and inexpensive but which serves to preclude reverse gas pressure transmission within the gas collecting plenum from effecting firing still unfired cartridges.

The invention also provides apparatus where a plurality of inflator cartridges are situated within, or at least partially situated within, a housing that defines a plenum chamber that collects gas emanating from all of the inflator cartridges as they are sequentially activated. In this apparatus pressure isolating means is associated directly with each individual inflator cartridge to preclude premature activation of cartridges which might otherwise be caused by activation of the first cartridge.

DESCRIPTION OF THE PREFERRED EMBODIMENTS

Figure 1:
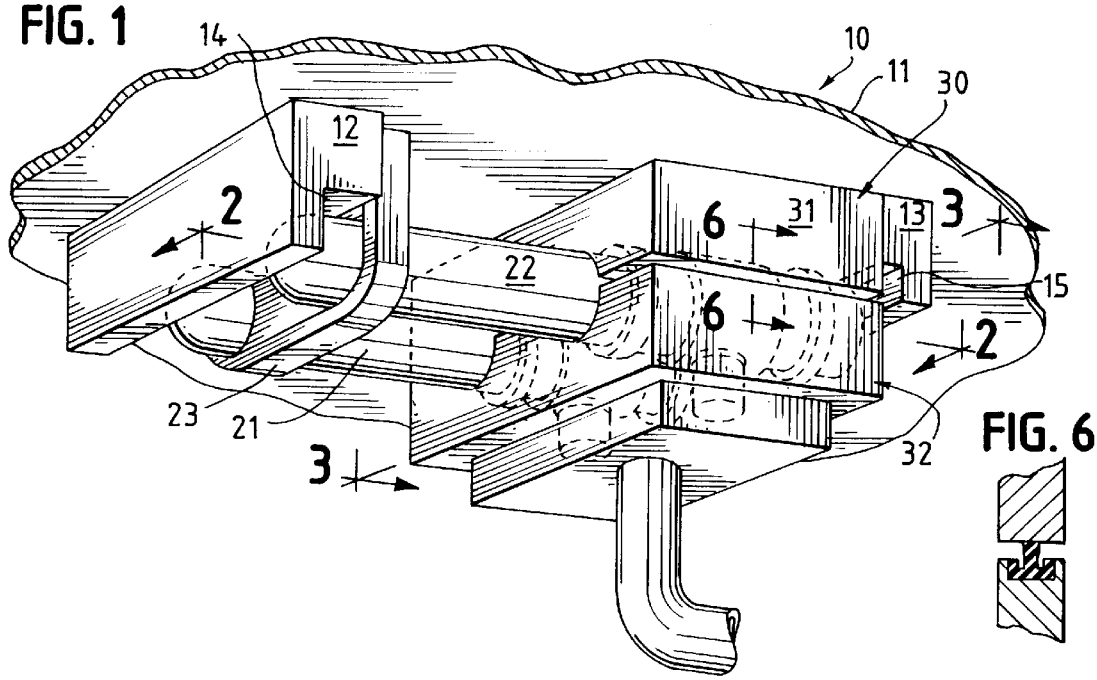
FIG. 1 is a perspective view of the inflator system of this invention as it would be attached to a supporting structure within a vehicle such as an aircraft.

At the onset it should be noted that the safety system of the present invention has applicability in any type of passenger vehicle, although it will be described primarily in conjunction with aircraft application where the apparatus described would be located in the space beneath a passenger seat. The description is therefore not intended to be limiting in scope but only illustrative of one safety system that can utilize the invention. For a more detailed description of the invention reference is made to FIG. 1 of the drawings where the numeral 10 identifies one construction of apparatus with which this invention is concerned. Numeral 11 identifies a broken away portion of supporting structure which could be a plate attached to the substructure of an aircraft seat, for example. It is not necessary that a plate be used as any type of structure could be used to support the components of the safety system. A pair of spaced apart supporting brackets 12 and 13 are attached to the plate 11 and each of a somewhat L-shaped configuration to provide recesses 14 and 15 for purposes to be described later. Bracket elements 12 and 13 are secured to plate 11 but can be supported by any other suitable type of supporting structure.

Supported within the recesses 14 and 15 of the mounting blocks 12 and 13 are the actual sources of inflating gas and the means for controlling the gas so that sequential firing will not occasion the premature firing of a second (or other subsequent) source of gas upon the firing of the squib associated with the initial gas source. Specifically, a pair of inflating gas sources in the form of elongated, cylindrical cartridges 21 and 22 are held in position, within recess 14 on the left end, as viewed in FIG. 1, by means of a supporting strap 23. The opposite ends of cartridges 21 and 22 are situated within the recess 15 of block 13 so that each end of the containers are in abutting relationship with the vertically extending walls of notches 14 and 15. This mounting construction in which the ends of the cartridges 21 and 22 abut against the vertical walls of the recesses 14 and 15 prevents longitudinal shifting of inflators 21 and 22 upon activation.

Figure 6:
FIG. 6 is a sectional view taken along the line 6—6 of FIG. 1.
Figure 2:
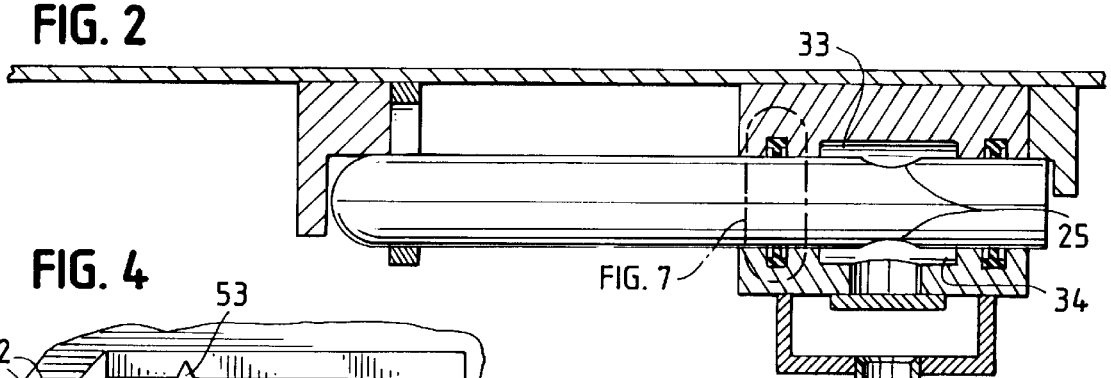
FIG. 2 is a side elevation, partly in section, taken along the line 2—2 of FIG. 1.

As best seen in FIG. 2 of the drawings, each of the inflators 21 and 22 have openings 25 that are sealed with rupturable or otherwise pressure releasing elements 26 that will vent the interior of each inflator when a firing squib (not shown) causes the gas within an inflator to expand. Surrounding the openings 25 on each inflator which characteristically are sealed by a frangible membrane, is a gas receiving structure 30 that completely surrounds a portion of the entire outer periphery of each of the inflators 21 and 22. Each structure 30 is comprised of an upper (as viewed in the drawings) section 31 and a lower section 32, which when placed together define recesses 33 and 34. Recesses 33 and 34 receive the inflators 21 and 22 and provide a gas containing volume 35 which is defined by the outer walls of the inflators and the inner walls of the structure 30. The gas isolating structure 30 sealingly encloses both containers at each end by means of container-conforming sealing gaskets 40 (see FIG. 6) and by means of flat gaskets 41 which are located between mating surfaces of the upper half 31 of isolator 30 and a lower half 32 of isolating structure 30. In an alternative design the structure 30 could be constructed as two individual bodies that are separate from each other so that no flat gaskets 41 are required to create separate volumes 35.

Figure 3:
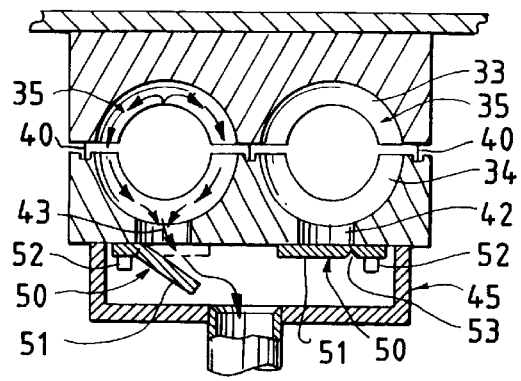
FIG. 3 is a sectional view taken along the line 3—3 of FIG. 1.
Figure 7:
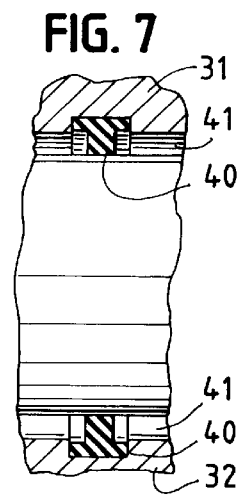
FIG. 7 is a sectional view of a portion of FIG. 2.

As can be seen by reference to FIG. 3, when gas exits from each of the inflators 21 and 22 it flows into the volume 35 which is formed within the isolating structure 30 in the area immediately surrounding the normally sealed openings 25. As the gas exits from openings 25 it flows around the containers 22 and 21 toward the gas exit ports 42 and 43, respectively and on into a gas receiving structure 45 that forms a plenum into which gas will flow from all inflators as they are activated.

One of the principal problems involved in the use of sequentially operated gas inflators arises from the fact that when the first of the inflators is activated, there is an immediate release of extremely high pressure gas. This gas creates a shockwave which can then be transmitted into contact with non-activated inflators which are to be fired at a later time, thereby possibly causing premature activation of the non-activated inflators. To prevent premature firing upon firing of the first inflator, the present invention utilizes unidirectional gas flow means that is operably mounted between the volume 35 associated with each inflator and the gas receiving structure 45 to prevent transmission of reverse gas pressure through structure 45 from one volume 35 into another. Reverse shock wave propagation can be effectively foreclosed by an apparatus comprising a one-way valve mechanism that will permit the flow of gas from each gas inflator as it is created but which will prevent reverse transmission of a pressure wave that arises from the earlier firing of any other inflator.

Figure 4:
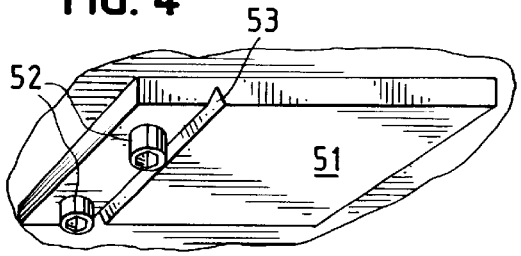
FIG. 4 is a perspective of one form of valving arrangement that can be used to prevent the blow back of a pressure surge between one inflator and another when both are connected into a common plenum.
Figure 5:
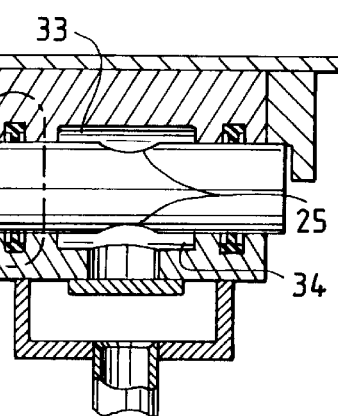
FIG. 5 is an enlarged fragmentary sectional view showing one form of an anti-blow back valve according to this invention in its open position.
Figure 5:
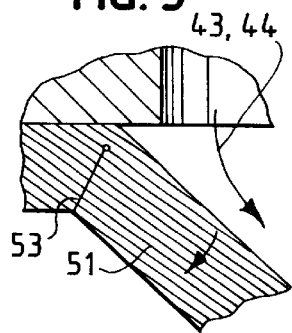

One apparatus for preventing transmission of a pressure surge can be seen in FIG. 3, where the volume 35 surrounding each inflator connects through openings 42 and 43 into the volume defined by structure 45. Structure 45 acts as a plenum to receive the gas of both inflators 21 and 22. Openings 42, 43 are normally closed by a one-way valve 50 which can take the form of a membrane or flapper plate 51 valve which is secured along one edge to the lower half 32 of the isolator 30 in such a position that each plate 51 completely blocks openings 42 and 43. Obviously the valve 50 can be omitted from the first to be fired of the inflators, since no pressure surge can exist prior to the first firing. FIG. 4 shows the manner in which the flapper valve plate 51 may be secured to structure 30 by means of the threaded fasteners 52 although, it will be appreciated that other forms of fasteners can be used as well. Adjacent to the point of attachment it can be seen that there is a V-shaped recess 53 in the plate valve 51 that defines a weakened area where stress concentration will occur when the plate is subjected to pressure from above (see FIG. 4). When an inflator is activated the pressure rise within the inflator pushes against plate 51 and causes the plate to pivot about the weakened line 53 as shown in FIGS. 3 and 5. When this occurs the pressure from inflator 21, assuming it is discharged first for example, will enter into the plenum 45 from port 43 and the shockwave will be prevented from entering into port 42 because upward pressure created against the valve membrane 51 cannot effect its opening. When inflator 22 is activated subsequently, the pressure will vent into plenum 45 and follow the gas already vented into the plenum toward the inflatable cushion (not shown).

A modified form of apparatus for preventing the transmission of gas pressure surges between inflator cartridges is illustrated in FIGS. 8–11. Referring to FIG. 8, numeral 60 corresponds to apparatus 10 shown in FIG. 1 and can be attached to the substructure of an aircraft seat in similar fashion. The construction of FIG. 8 includes means for defining a single volume for receiving pressurized gas from a plurality of inflators, as well as means for preventing a pressure surge from effecting undesired, premature firing of cartridges to be fired at a later time in a firing sequence.

Apparatus 60 is comprised of two matable halves 61, 62 joined by suitable fastening elements, such as threaded fasteners 63. When assembled, parts 61, 62 define a single interior volume 65, which performs functionally like the plenum chamber 50 of the apparatus illustrated in FIGS. 1–7. Volume 65 contains a plurality of inflator cartridges 66, which are here shown as two in number for descriptive purposes only. The volume 65 opens into gas release passages created by pipes 67 for the purpose of conducting gas into the inflatable bag.

Since the gas created by the inflators 66 is extremely hot when first released into volume 65, a coating 68 of thermally stable material is supplied as a continuous layer of protective material on the inner walls of mating apparatus halves 61, 62. Layer or coating 68 is indicated schematically by the dotted lines 69 seen in FIG. 8. Substances such as metal/non-metal refractories are suitable for use as substances that provided a protective thermal barrier. For example oxide and carbide compounds of metals such as aluminum, tungsten, boron, and other metals known in the trade may be used.

Each of the cartridges 66 is of the type discussed earlier wherein a normally closed pressure releasing structure exists in each cartridge, usually in the form of a rupturable membrane 26 built into the cartridge wall. In view of the fact that cartridges 66 are contained within single volume 65, means are required whereby the pressure releasing structure 26 of each cartridge is isolated from the pressurized gas created by a cartridge activated earlier. In the configuration shown in FIGS. 9–11, the means isolating the rupturable membrane 35 is what is in effect a uni-directionally acting valve 70. This valve 70 is shown as an apparatus comprised of two elements 71 and 72 that are shaped to conform to the outer surface of the cartridge at a location over the rupturable membranes 26. The two elements can advantageously be made as a single part with a longitudinally extending weakened line 74. Line 74 acts as a pivot axis which permits the elements 71, 72, to pivot away from each other, as seen in FIG. 11, when the cartridge with which valve 70 is associated is activated. Valve 70 can be mounted on a cartridge through its own spring clamping pressure or can be held in desired position by a suitable, light adhesive. The particular means for mounting valve 70 on a cartridge is not important, so long as elements, 71, 72 are free to pivot apart when its associated cartridge is activated.

In operation, when the first cartridge, which may or may not have a valve 70 mounted on it, is activated the resulting pressure wave cannot rupture membranes 26 because they are isolated from the pressure by the elements 71 and 72. Only at such time as when each cartridge is activated by its own firing mechanism will the membrane be ruptured and elements 71 and 72, pivoted away from the body of the cartridge.

While this invention has been described as having certain preferred features and embodiments, it will be understood that it is capable of change and modification within the spirit and scope of the invention and this invention is intended to cover all modifications, additions and variations that fall within the spirit of the invention and within the scope of the appended claims.

What is claimed:

1. Apparatus for supplying gas to an inflatable bag used in vehicle passenger restraint systems which systems utilize a plurality of inflator cartridges and circuitry for activating a first cartridge and thereafter sequencing activation of remaining cartridges, the apparatus comprising:
    (a) means for releasing pressure from a first and each remaining cartridge upon activation thereof;
    (b) means defining a volume for receiving pressurized gas from each cartridge; and
    (c) means operatively associated with at least each cartridge to be activated subsequent to the first cartridge, for isolating the pressure releasing means of each such subsequent cartridge from pressure created by an earlier activated cartridge.

2. An apparatus as defined in claim 1 wherein the means for releasing pressure is a pressure rupturable membrane.

3. An apparatus as defined in claim 1 wherein the means for isolating the pressure releasing means is a uni-directional valve.

4. An apparatus as defined in claim 3 wherein the unidirectional valve comprises a membrane that moves only in a direction away from the pressure releasing means.

5. An apparatus as defined in claim 4 wherein the membrane comprises a plate element configured to rotate about a pivot axis.

6. An apparatus as defined in claim 5 wherein the plate element is attached to a cartridge in overlying relationship with respect to the pressure releasing means.

7. An apparatus as defined in claim 1 the means defining a volume is configured in a form placing each cartridge within a volume separate from a volume surrounding any other cartridge.

8. An apparatus as defined in claim 7 wherein each separate volume is operably connected to a common passage and pressurized gas can flow only from each separate volume into the common passage.

9. An apparatus as defined in claim 1 wherein the means for defining a volume is configured to define a single volume for receiving gas from all cartridges.

10. An apparatus as defined in claim 9 wherein initially sealed pressure outlets are covered by a uni-directionally moveable membrane that is disposed on the cartridges.

11. Apparatus for supplying gas to inflatable bags used in vehicle passenger restraint systems, which systems utilize a plurality of inflator cartridges and circuitry for activating a first cartridge and thereafter sequencing activation of remaining cartridges, the apparatus comprising:

(a) structure defining a closed volume having an outlet opening;

(b) a plurality of inflator cartridges contained within the closed volume;

(c) pressure releasing structure associated with each inflator cartridge that upon activation of a cartridge releases pressurized gas into the closed volume; and (d) a uni-directally acting valve operatively associated between inflator cartridges, whereby the pressure releasing structure of each non-activated cartridge is isolated from pressurized gas created by an activated cartridge.

12. Apparatus as defined in claim 11 wherein the structure defining a closed volume is constructed with matable sections that upon assembly together define individual separated volumes that each hold an inflator cartridge.

13. Apparatus as defined in claim 12 wherein structure forming a plenum chamber is operably connected to each individual chamber and a unidirectional valve is mounted between each individual volume and the plenum chamber; whereby pressurized gas flow is effected only from the individual volumes toward the plenum chamber.

14. Apparatus as defined in claim 11 or 13 wherein the uni-directionally acting valve is a moveable membrane.

15. Apparatus as defined in claim 14 wherein the membrane is plate element constructed to rotate about a pivot axis.

16. Apparatus for supplying gas to an inflatable bag used in vehicle passenger restraint systems which systems utilize a plurality of inflator cartridges and circuitry for activating a first cartridge and thereafter sequencing activation of remaining cartridges, the apparatus comprising:

(a) a plurality of inflator cartridges;

(b) at least one initially sealed pressurized gas outlet associated with each cartridge;

(c) means surrounding at least the initially sealed pressure outlet of all of the plurality of cartridges for defining a volume that receives the gas generated by each cartridge when it is activated; and (d) means operatively associated with at least each cartridge to be activated subsequent to activation of the first cartridge, for isolating the initially sealed passages of each subsequently activated cartridge from the pressure created by activation of a prior cartridge.

17. Inflator apparatus for use with a vehicle passenger restraint system utilizing an inflatable gas bag comprising:

(a) at least two gas pressurized generating inflator cartridges having initially sealed passages that open to permit flow of gas out of the containers when the cartridges are activated;

(b) a housing surrounding at least the initially sealed passages on the inflator cartridges to form a volume to receive gas generated by the cartridges;

(c) a cartridge firing circuit including circuit control means for sequencing activation of the cartridges; and (d) a pressure isolating member operatively associated with at least each cartridge that is activated after the first cartridge, whereby the initially sealed passages are isolated from the gas pressure generated by prior cartridge activation.

18. Apparatus as defined in claim 17 wherein the pressure isolating member is a membrane operably positioned to isolate each initially sealed outlet passage of each later activated cartridge from the pressure generated by each earlier activated cartridge.

19. Apparatus as defined in claim 18 wherein the membrane is movable only in a direction away from the initially sealed opening it is isolating on a cartridge.

20. Apparatus as defined in claim 19 wherein the membrane includes means for providing pivotal movement of the membrane away from the pressurized gas generated by the inflater it is isolating from earlier activation of another cartridge.

* * * * *